US008608112B1

(12) United States Patent
Levay

(10) Patent No.: US 8,608,112 B1
(45) Date of Patent: Dec. 17, 2013

(54) MODULAR PROGRAMMABLE ELECTRONIC INITIATION DEVICE FOR PARACHUTE DISREEFING OR DISCONNECT

(75) Inventor: Anthony J. P. Levay, Macedonia, OH (US)

(73) Assignee: ALD Systems, Inc., Macedonia, OH (US)

( * ) Notice: Subject to any disclaimer, the term of this patent is extended or adjusted under 35 U.S.C. 154(b) by 1033 days.

(21) Appl. No.: 12/072,812

(22) Filed: Feb. 28, 2008

Related U.S. Application Data

(60) Provisional application No. 60/903,888, filed on Feb. 28, 2007.

(51) Int. Cl.
*B64D 17/58* (2006.01)

(52) U.S. Cl.
USPC .......................................... 244/149; 244/150

(58) Field of Classification Search
USPC ......................................... 244/147, 149, 150
See application file for complete search history.

(56) References Cited

U.S. PATENT DOCUMENTS

| | | | | |
|---|---|---|---|---|
| 3,547,383 A | * | 12/1970 | Carpenter, Jr. ................ | 244/150 |
| 4,858,856 A | | 8/1989 | Cloth | |
| 5,825,667 A | * | 10/1998 | Van Den Broek ............ | 702/141 |
| 5,881,974 A | * | 3/1999 | Larsen et al. ................. | 244/149 |
| 6,081,575 A | * | 6/2000 | Chevallier ....................... | 377/20 |
| 6,293,202 B1 | * | 9/2001 | Woodall et al. ............... | 102/387 |
| 6,378,808 B1 | | 4/2002 | Smolders | |
| 6,754,584 B2 | | 6/2004 | Pinto | |
| 6,880,786 B2 | | 4/2005 | Weis et al. | |
| 6,953,173 B2 | * | 10/2005 | Lukavec ....................... | 244/149 |
| 7,073,752 B2 | | 7/2006 | Voronka et al. | |
| 7,461,817 B1 | * | 12/2008 | Hansson et al. .......... | 244/151 B |
| 7,703,720 B2 | * | 4/2010 | Smith et al. .................. | 244/152 |
| 2005/0127243 A1 | * | 6/2005 | Voronka et al. ............... | 244/150 |
| 2007/0252042 A1 | | 11/2007 | Smith et al. | |

\* cited by examiner

*Primary Examiner* — Joseph W Sanderson
(74) *Attorney, Agent, or Firm* — Law Ofc. of Joseph R. Cruse, Jr.; Joseph R. Cruse, Jr.

(57) ABSTRACT

A programmable electronic initiation device that monitors flight parameters to accurately initiate parachute disreefing or disconnect. Tracking elapsed time commencing with a startup trigger and directly measuring atmospheric conditions; temperature and pressure are used for altitude or speed calculations in addition to monitoring the acceleration sensor and liquid contact sensor for impact sensing. The device is user programmable via a software application for initiation based upon elapsed time, altitude, speed, and/or upon landing. The device may also be separated into a sensing module and an actuating module, and linked wirelessly to allow control of one or multiple actuating modules by one sensing module.

7 Claims, 5 Drawing Sheets

MODULAR PROGRAMMABLE ELECTRONIC INITIATION DEVICE FOR PARACHUTE DISREEFING OR DISCONNECT

CROSS-REFERENCE TO RELATED APPLICATIONS

Applicant claims the benefit of Provisional Patent Application Ser. No. US60/903,888, filed Feb. 28, 2007.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC

Not Applicable

BACKGROUND OF THE INVENTION

Description of Related Art

The following prior art discloses the various aspects in the design and use of automated preprogrammed parachute deployment devices.

U.S. Pat. No. 4,858,856, granted Aug. 22, 1989, to H. Cloth, discloses a pressure dependent releasing device for a parachute, which is ready for use and folded and disposed in a receptacle and held together by securing string against the force of an unholding preloaded spring. The release device includes a breaking device for disconnecting the securing string and a control for actuating the breaking device at predetermined conditions. The control actuates the breaking device by an electric control signal derived after an initialization operation and depending on a barometric pressure which is present and further depending on the presence of a given pressure change rate. The breaking device comprises an energy storing device which is releasable by the electric control signal for disconnecting the securing string.

The device, as disclosed by Cloth, ensures that a parachute has been deployed above a non-changeable preprogrammed minimum altitude by automatically activating a reserve parachute deployment if the device detects a high descent velocity. The user has virtually no programmability of such automatic activation devices, which themselves have no control beyond the deployment stage of the parachute.

U.S. Pat. No. 6,378,808, granted Apr. 30, 2002, to J. Smolders, discloses a parachute release device that is mounted on a parachute, which parachute is provided to be attached to an object. The device has a data processing system having a release signal output and a memory provided for storing data. The data processing system is provided for generating a release signal for opening a parachute. The device further has altitude determining device connected to said data processing system and provided for determining altitude values; and time determination means provided for determining the free fall duration as from the start of the dive. The memory is provided for storing a plurality of series of theoretical dive data, said theoretical dive data indicating for each distance value a corresponding theoretical time. The data processing system is further provided for selecting a series of theoretical dive data in function of the determined altitude values and the determined free fall duration.

U.S. Pat. No. 6,754,584, granted Jun. 22, 2004, to R. Pinto, et al., discloses an attitude measurement using a single GPS receiver with two closely-spaced antennas. This system determines the three-dimensional attitude of a moving platform using signals from two closely spaced Global Positioning System (GPS) antennas. The system includes three rate gyroscopes and three accelerometers rigidly mounted in a fixed relationship to the platform to aid in determining the attitude. The system applies signals from a first of the two GPS antennas to sufficient channels of a GPS receiver to support navigation. The system applies signals from a second of the two GPS antennas to the remaining receive channels, which are configured to support interferometry. The system optimally selects the navigation and interferometry channels to provide an interferometric heading solution. The system resolves the ambiguity normally associated with the interferometric heading solution by having the closely spaced GPS antennas and using interferometry to refine a coarse heading estimate from a GPS plus Inertial Measurement Unit (IMU) transfer alignment solution. The system achieves close sub-meter spacing of the two GPS antennas by merging many temporal interferometric measurements that result from an attitude memory provided by the IMU time-history solution.

U.S. Pat. No. 6,880,786, granted Apr. 19, 2005, to B. J. Weis, et al., discloses a static line parachute automatic activation device, whose apparatus and method improves the safety of static line parachute jumping are disclosed. According to the method, a safety device situated on a jumper continuously or periodically senses the distance of the jumper from the jumping platform (e.g. an aircraft). The safety device compares this distance to a predetermined distance threshold. When the distance between the jumper and the jumping platform reaches or exceeds the predetermined distance threshold, the safety device enables the reserve parachute deployment device which automatically deploys the reserve parachute if at such time the jumper's rate-of-descent is at or greater than a predetermined rate-of-descent threshold. Thus, the apparatus enables its reserve parachute deployment portion when the jumper is at least a predetermined distance from the jumping platform.

U.S. Pat. No. 7,073,752, granted Jul. 11, 2006, to N. Veronka, et al., discloses an electronic automatic reserve or primary parachute activation device incorporates partial or complete capture of freefaller or tethered parachute jumper kinematics to rapidly and reliable determine when to automatically activate deployment of the primary or reserve chute. This device uses means for directly measuring acceleration, velocity and/or position in addition to air pressure change to enable reliable detection of chute deployment conditions earlier than is possible with conventional pressure change activated automated activations devices. This is important when the activation decision must be made within 5-10 seconds of the initiation of the jump as is the case for military low altitude parachuting.

BRIEF SUMMARY OF THE INVENTION

Field of the Invention

Parachute airdrops are used as a way to deliver payloads of all kinds from an aircraft to the ground, including personnel. In all cases, these parachutes must properly go through several stages of deployment and inflation for the payload to be subjected to the intended landing conditions and are subject to special terms of art.

"Opening" of a parachute container refers to the letting go of a retaining flap or other securing mechanism. The action of letting go of said retainer is often stated as, but must not be confused with, the action of releasing.

"Releasing" of a parachute refers to completely separating all physical connections of the parachute from the falling object or person. "Disconnecting" a parachute is used synonymously to this definition of releasing.

"Inflating" or "Inflation of a parachute" is the action of air entering and filling the parachute after the parachute container has been opened. The parachute cannot begin inflation until after opening of all containment apparatus and the parachute is exposed to the airstream.

"Deploying" or "Deployment of a parachute" refers to the events that begin with the opening of a parachute container or containment apparatus. Deployment also refers to the management of parachute lines and components up to the inflation stage.

"Reefing" refers to a method of parachute management during the inflation stage, in which the parachute is restricted from full inflation.

"Disreefing" is the action of removing the restriction to allow the parachute to further inflate either to a subsequent reefing stage or to full inflation.

In general, the present invention relates to a programmable electronic initiation device, and more particularly to an electronic initiation module that is programmed by an individual for a planned initiation. The device is adapted for precisely monitoring the elapsed time, in milliseconds, commencing with a startup trigger and, optionally, directly measuring atmospheric conditions; temperature and absolute or differential pressure, that are used for altitude or speed calculations; in addition to optionally monitoring the acceleration sensor and liquid contact sensor for impact sensing; and for initiation, a method of sending a control signal to an electrically actuated disreef or disconnect mechanism at the moment when the elapsed time reaches the user programmed, elapsed time value, which can be any value greater than zero. A digital data processor, preferably a microprocessor, is used to precisely monitor the elapsed time, in milliseconds. The control signal, to the electrically actuated disreef or disconnect mechanism, is via a supply voltage multiplication stage, controlled by the digital data processor.

More specifically, the invention device separately uses time or sensor measurements to trigger disreef of disconnect initiation, but time may be further used as a sensor lockout or backup, wherein lockout signifies the sensors are disabled until time expires, and backup signifies to trigger initiation at the time expiration if the sensors have not already.

The system for precisely monitoring the elapsed time is a module that is physically separated from the actuating module and provides a control signal to an electrically actuated disreef or disconnect mechanism; and also provides a direct wireless communication between the two modules. The wireless communication between the two modules is a radio frequency link, which may be one way or two way communication. This module provides for the precise monitoring of elapsed time and may wirelessly communicate with and control one or more actuating modules, which emit the control signal to electrically actuate the disreef or disconnect mechanism.

The system for precisely monitoring the altitude after a startup triggered input, and a method of sending a control signal to an electrically actuated disreef or disconnect mechanism at the moment when the altitude reaches the user programmed altitude value, can be of any value, at or above ground level, up to the drop altitude, for initiation.

The system for precisely monitoring the altitude or speed employs a plurality of sensors, which may include: one or more pressure sensors, one or more temperature sensors, one or more accelerometers, and one or more liquid sensors, from which data may be used, by the digital data processor, to calculate altitude or speed, which may be real-time calculations, in order to more accurately determine speed or altitude, which may include ground level, during long descents through varying atmospheric conditions. These sensors may be digital transducers, or digitally converted, analog transducers.

It is the primary object of the present invention to provide control methods of the inflation stage of the parachute. Following a parachute deployment, the parachute may be held in a partially restricted condition, known as the reefed condition. The subject invention provides methods for removing the partially restricted condition from, or disreefing, the parachute upon meeting user programmed criteria. As such, my invention is useful not only for deployment of a parachute, but more importantly, this invention discloses methods for disreefing the parachute.

It is the secondary object of the present invention to provide control methods to disconnect the parachute from the payload, such as, to prevent damage to the payload on parachute touching down. Parachute disconnect is accomplished by, upon meeting user programmed criteria, the control of a disconnect method. One such method is the use of a disconnect apparatus, such as that described under U.S. Pat. No. 7,264,205 to Fox, which employs an apparatus to disconnect the parachute from a payload.

A third objective of the present invention is to provide improvement in the measurement accuracy of time intervals, which is a function of the accuracy of the device that triggers the external event.

It is therefore an object of the present invention to provide accuracy and scale of time. The elapsed time is measured in microseconds and made use of in milliseconds, whereas prior art devices generally make use of time in units of seconds only. Time determination is dependent upon a "startup triggering event", which may be the operation of a switch, which may be either internal or external to device, or a signal from flight computer onboard the aerial vehicle. It should not be assumed that this is not a pre-programmed event. Other devices imprecisely calculate start-time based on sensor input to determine when the exit from the aircraft occurred, while the present invention utilizes a positive/negative indication with no gray area. Other devices also use time only as an input for altitude calculations, while the subject invention can be user programmed to operate based solely on time, ignoring altitude.

It is another object of the present invention to provide the use of temperature in conjunction with pressure, as related to altitude or speed determination, to calculate altitude or speed in real-time. Temperature is largely a contributor to the relationship between pressure, density, speed and altitude. The accuracy of altitude or speed calculations can be greatly improved with real-time measurement of temperature, especially at higher altitudes near 30,000 ft. Whereas many other prior art devices sacrifice accuracy by basing their calculations on Standard Day conditions, or making adjustment based on ground level temperatures.

It is a final object of the present invention to precisely monitor time and/or sensor input, wherein said monitoring is physically separated, as a module, from the control signal and electrically actuated disreef or disconnect mechanism, as a module, and comprises a means for wireless communication between the separated modules.

BRIEF DESCRIPTION OF THE DRAWINGS

A complete understanding of the invention may be obtained by reference to the accompanying drawings when taken in conjunction with the detailed description thereof and in which.

DETAILED DESCRIPTION OF THE INVENTION

Parachute airdrops are used as a way to deliver payloads from an aircraft to the ground, including personnel. In all cases, the parachutes must correctly go through the stages of deployment and inflation for a safe or soft landing. My invention includes the components or elements shown in the following

PARTS LIST

Figure 1:
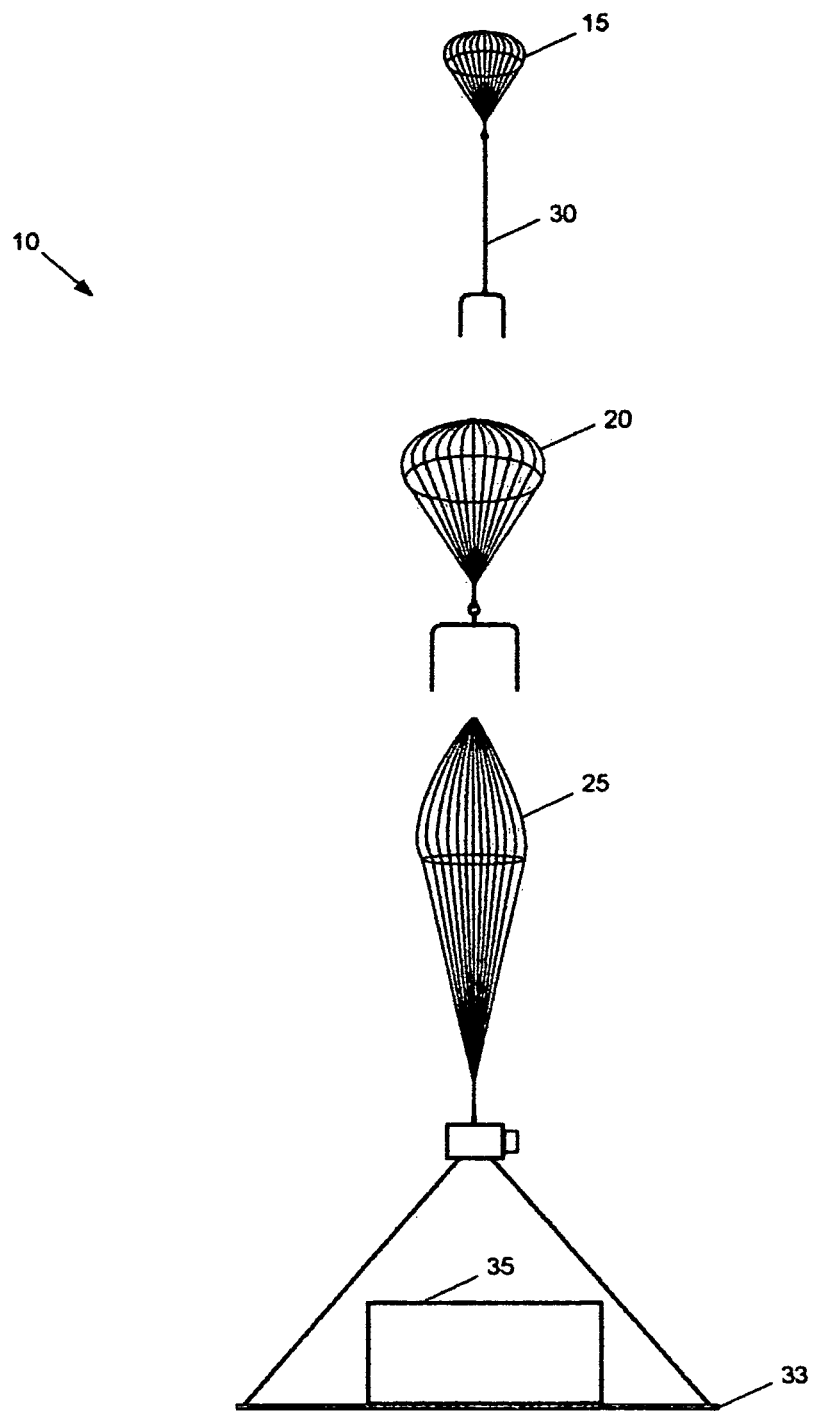
FIG. 1 is a pictorial representation of the drogue parachute, the extraction parachute, the inflate cargo recovery parachute and a cargo container.
The drogue and extraction are in opposite positions from actual (very important to correct). Neither is required for every airdrop, as each airdrop setup is application specific. Cargo container is a non-typical representation.

10. Parachute airdrop system
15. Extraction parachute
18. Drogue parachute deployment bag
20. Drogue parachute
23. Main parachute deployment bag
25. Cargo recovery parachute
30. Extraction line
33. Airdrop platform
35. Cargo payload
40. E.I.D. complete module
45. Sensing module
50. Actuating module
55. Disconnect apparatus Shown in FIG. 1 is a typical parachute airdrop system 10 using a parachute delivery system that includes an extraction parachute 15, a drogue parachute 20 and a reefed cargo recovery parachute 25.

In a typical applied extraction airdrop, the extraction chute 15 is released from the rear cargo area of the aircraft, where it inflates and pulls the payload, mounted atop an airdrop platform, out of the aircraft via the extraction line 30. Upon releasing the extraction line 30 from the airdrop platform 33, the extraction chute 15 deploys the drogue chute 20. Once the drogue chute 20 is disconnected from the payload, the cargo recovery chute 25 is deployed. After deployment, the cargo recovery chute may be allowed to inflate either fully or only partially, in a reefed state after which it descends the cargo payload 35 to the ground. The payload 35, upon striking the ground, may disconnect from the cargo recovery chute 25, thereby preventing the cargo from being dragged along the ground, where it can be overturned and the contents could be subsequently damaged The parachute deployment stage is followed by the inflation stage. The inflation of a parachute, or a cluster of parachutes, can be controlled or limited by holding the parachutes partially closed, or reefed. Reefing may be done with a textile cord, called a reefing line. One purpose of reefing is to stage parachute inflation to reduce opening shock. The length of time for which a parachute will remain in a reefed state varies with parachute type and application, after which the parachute is disreefed, either fully or to subsequent reefing stages.

Disreefing is accomplished by severing the reefing line, traditionally with a mechanically actuated cutter. Due to limitations of these mechanically actuated cutters, exceptionally long and/or extremely accurate time delays are not possible. An electronic initiation device paired with an electrically actuated cutter is a solution to both of these limitations. An electrically actuated cutter easily replaces the traditional mechanically actuated versions, but since the location of the reefing line and cutter is typically on the parachute, integration of an electronic initiation device introduces some challenges.

Figure 2:
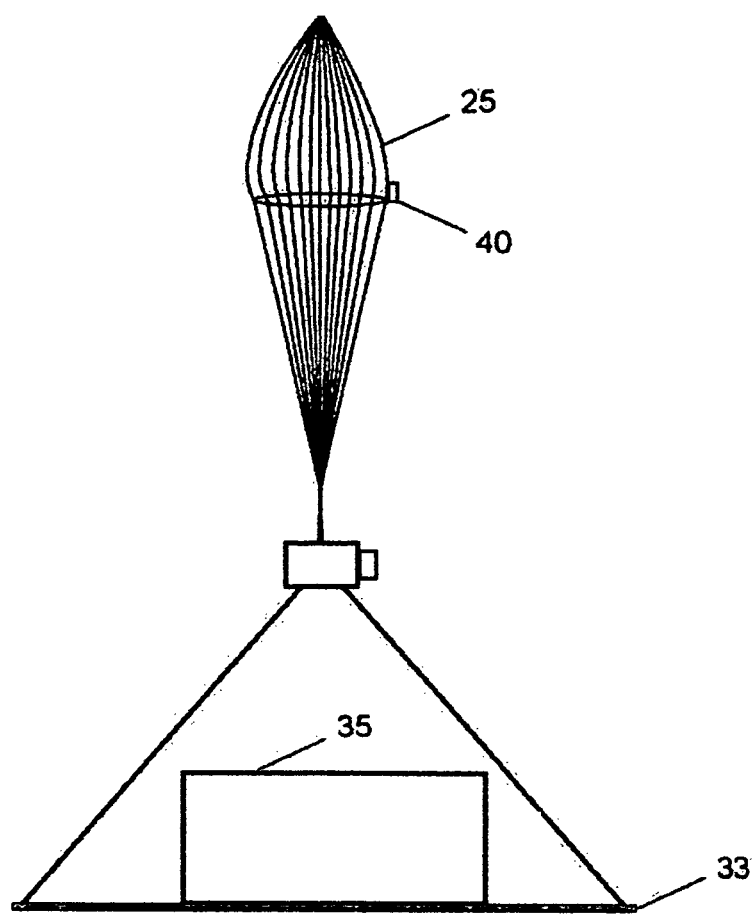
FIG. 2 is a pictorial side view of an inflated cargo recovery parachute and cargo container. Non-representative: "release clamp" (see U.S. Pat. No. 7,264,205), "actuating module" location (actual location is on "release clamp" OR sewn directly onto parachute).

There is shown in FIG. 2 a reefed parachute that is lowering, at a high rate of descent, the cargo container payload, until meeting the user programmed flight parameter, of time or other condition, when the complete module sends a signal to actuate the disreef mechanism.

Figure 3:
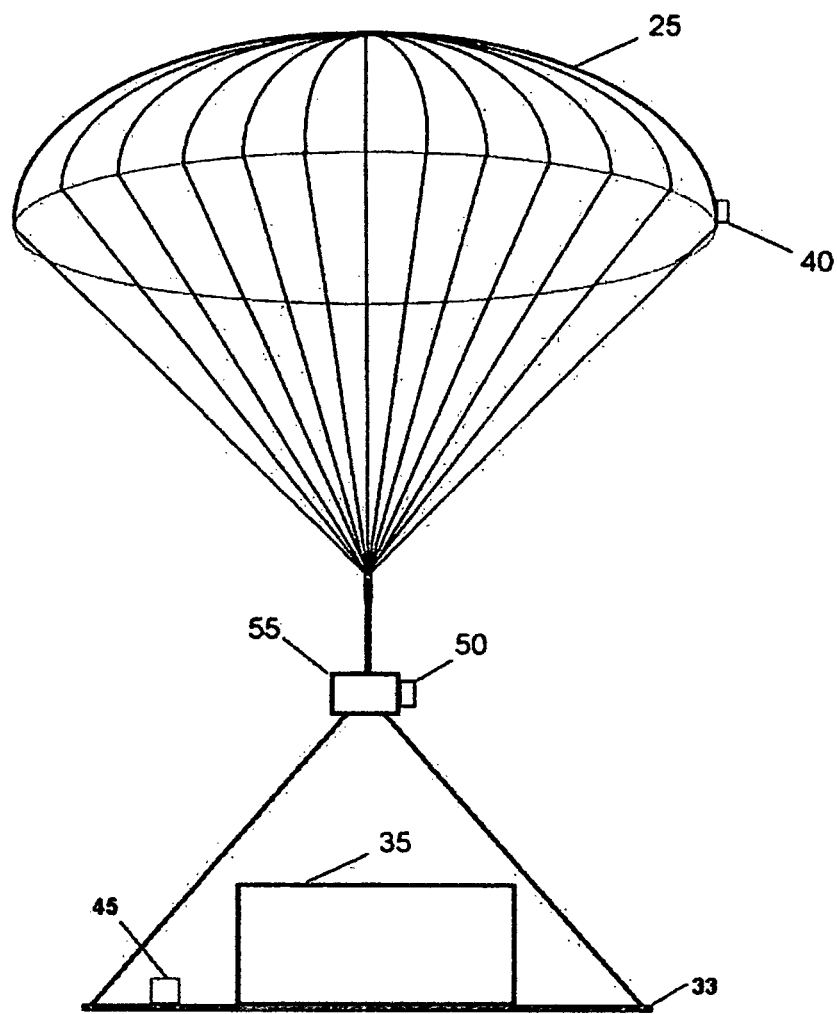
FIG. 3 discloses the electronic initiation device mounted on a cargo recovery parachute, an actuating module associated with the disconnect apparatus and independent of the sensing which is positioned on the airdrop platform.

There is shown in FIG. 3 a fully inflated parachute 25, which was disreefed via a complete module 40, that is lowering the cargo container payload 35 and airdrop platform 33, hits the ground, sending an acceleration impulse to the sensing module 45 and on to the actuating module 50 to send a signal to actuate the disconnect apparatus 55.

Figure 4:
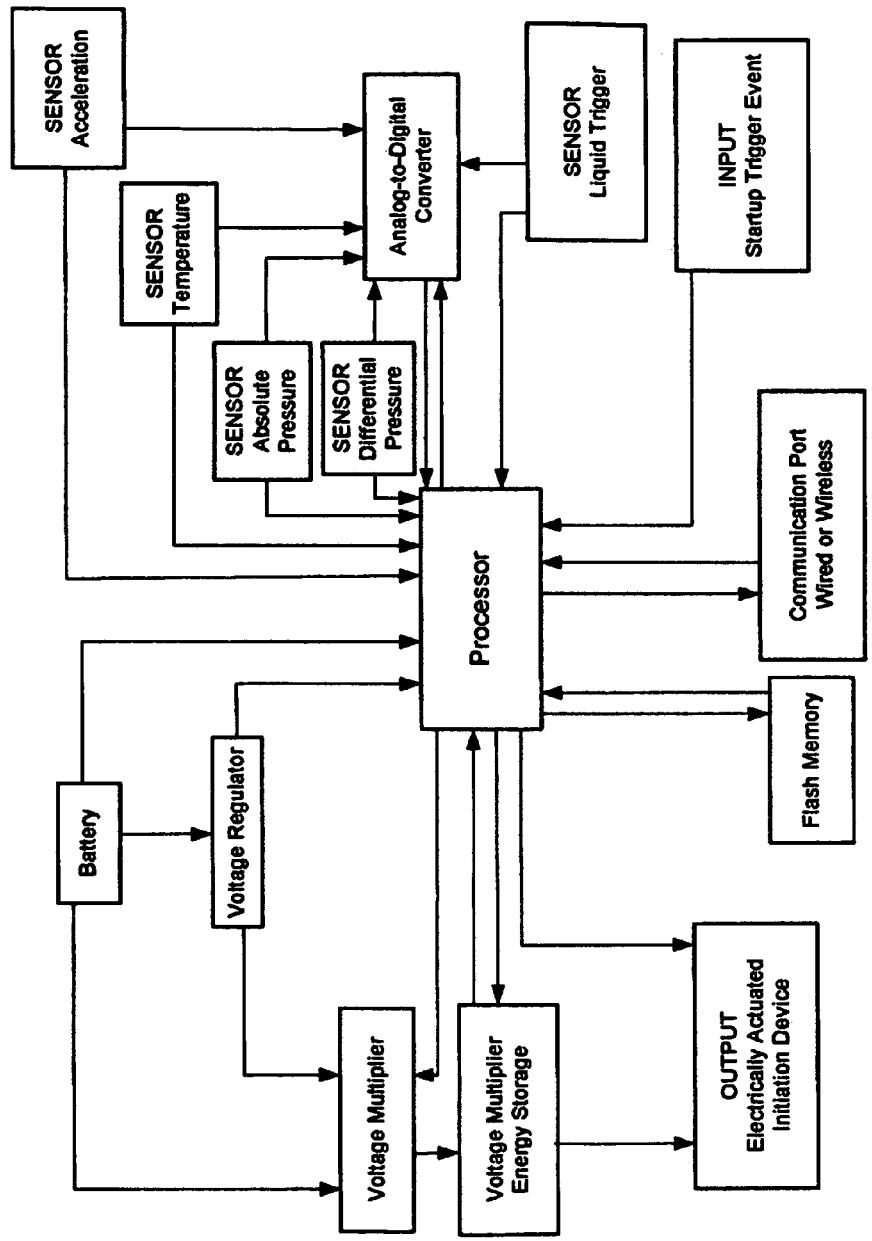
FIG. 4 is a block diagram of a alternative embodiment of the present invention showing a user programmable Electronic Initiation Device having a plurality of RF communicating modules; comprising basically RF communicating sensor modules and RF communicating control actuating modules. Multiple Receiver/Actuating Modules may be used with one Transmitter/Sensing Module

The block diagram shown in FIG. 4, the programmable electronic initiation device of the present invention that monitors the flight parameters to accurately initiate the parachute disreefing or disconnect sequences that are derived from the acquisition of the physical parameters or from the computed parameters that are based upon the acquired physical parameters.

The tracking of the elapsed time commences with the input startup trigger, an analog signal that is digitized to be processed and used within the microprocessor.

The microprocessor is end-user programmed via a software application for the initiation based upon elapsed time, altitude, speed, and/or accelerations or upon landing. End-user programmability is accomplished via wireless communication with a computer or through a programming panel (not shown) that connects into a communication port of a computer.

Direct measurement of the atmospheric conditions, the temperature of the air and the absolute or differential pressure, are used to obtain real-time calculations of altitude or speed. The pressure altitude is the altitude in standard atmosphere at which a given pressure will be observed. It is the indicated altitude of a pressure altimeter at an altitude setting of 29.92 inches of mercury, and is therefore the indicated altitude above the 29.92 constant pressure surface.

Cutter actuation is not only used for disreefing parachutes, but may also be used for disconnecting parachutes or parachute system modules. Examples of such events would be: (1) releasing short-sheeted parachute control lines after inflation (brake release), (2) repositioning a payload, which is suspended under a parachute, by releasing short-sheeted bridle legs, and (3) releasing a drogue from a payload in drogue-fall.

The input sensors include the direct measurement of acceleration, Temperature, Pressure, elapsed time commencing with the input of a starting trigger, and the actuation of the liquid Trigger sensor. Each of the one of the physical sensors are introduced into the microprocessor to be compared to user programmed initiation parameters.

In addition, the microprocessor monitors the acceleration sensor and liquid contact sensor for impact sensing, which may initiate parachute disconnect from the payload to prevent it from being dragged, in the event of high winds at ground level.

Parachutes are generally packed inside of a bag prior to deployment. The electronic initiation device of the present invention must be able to accommodate being packed-up and the standby periods, which may vary from minutes to days to years. The device must have as little mass as possible, as to not interfere with the structural integrity or flight characteristics of the parachute, so minimal size and weight is desired. While it is assumed batteries and programmable initiation parameters would be attended to prior to packing, a method to wirelessly program initiation parameters and check system health is desired.

In addition to disreefing based on elapsed time, altitude based disreef may also be desired. A means for disreef based on real-time altitude determination is another advantage over using mechanically actuated cutters alone.

Parachute airdrops are often done with the payload assembled on an airdrop platform. In drogue-fall, the platform assembly will normally have at least four suspension sling attachment points, and the opposite end of each sling meets the drogue bridle at a confluence fitting. Traditionally, drogue release is actuated by one large cutter at each suspension sling attachment point on the platform combined with a centrally located bulk of batteries and electronics. If using a single point, parachute release apparatus, such as U.S. Pat. No. 7,264,205 to Fox, a single electronic initiation device can be used to initiate drogue disconnect at a given time delay or altitude. A similar method can be employed to disconnect a parachute upon landing by employing an electronic initiation device capable of sensing impact with land or water.

Single module electronic initiation devices and multiple module versions both require a trigger to start the initiation sequence. While the single module version can use an onboard switch to start the initiation sequence, a payload mounted module has additional options. The initiation start trigger may also be an external switch or even an input from a flight computer, if the payload is equipped with one. In such cases, the programmable initiation parameters may be selected to allow immediate initiation.

Figure 5:
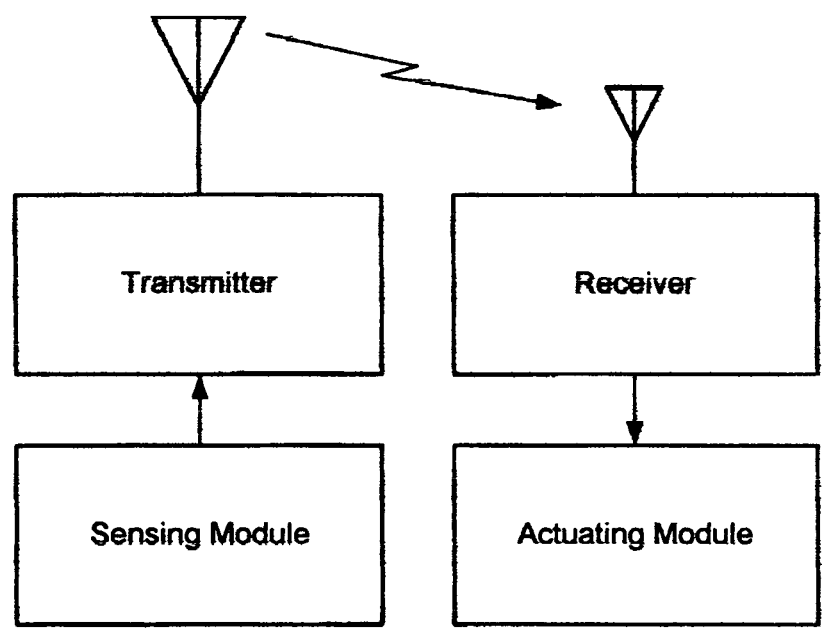
FIG. 5 is a block diagram of a alternative embodiment of the present invention showing a user programmable Electronic Initiation Device having a plurality of RF communicating modules; comprising basically RF communicating sensor modules and RF communicating control actuating modules A better understanding and appreciation of these and other objects and advantages of the present invention will be obtained upon reading the following detailed description of the preferred embodiment when taken in conjunction with the accompanying drawings.

An additional advancement shown herein is division of the device into modules, allowing sensing module to be mounted on the payload, and actuating modules to be mounted on the parachute or confluence fitting while maintaining an RF link between the two modules, which are configured as transmitters and/or receivers, as is illustrated in FIG. 5. This enables further decreasing the size and weight of the parachute mounted modules, as well as, allowing the payload mounted, sensing module to control multiple actuating modules simultaneously or independently of one another. Stated otherwise, in the present invention there is separation between a sensing module and an actuating module; but whereby each is linked wirelessly to allow control of one or multiple actuating modules by one sensing module.

For example, multiple actuating modules could be used to simultaneously disreef multiple parachutes of a cluster, or to actuate sequential disreef stages of one parachute or parachute system. Furthermore, by employing RF communication and multiple actuating modules in one airdropped parachute system, the sensing module may signal initiation of multiple dissimilar events, simultaneous or sequential, such as the aforementioned examples of parachute disreefing, drogue disconnect, brake release, and disconnecting a parachute upon contact with land or water.

Single module electronic initiation devices and multiple module versions both require a startup triggering event to begin the initiation sequence. While the single module version can use an onboard switch to start the initiation sequence, a payload mounted module has additional options. The initiation start trigger may also be an external switch or even an input from a flight computer, if the payload is equipped with one. In such cases, the programmable initiation parameters may be selected to allow immediate initiation.

The programmable feature of an electronic initiation device is highly useful in parachute airdrops to accurately actuate a disreef or disconnect device. Existing automatic activation devices are useful for parachute deployments, but this electronic initiation device will aid in sequencing post-deployment parachute, parachute system events and landing events.

It should be understood that although the present invention is described in detail for its particular embodiments, there may be other variations and modifications that will become apparent to those who are skilled in the art upon reading this specification, and that these modifications or variations that can be made should not detract from the true spirit of this invention.

What is claimed is:

1. A programmable electronic initiation device for a parachute, comprising a microprocessor:
    said microprocessor programmed by the user with initiation parameters,
    said microprocessor possessing inputs which include a startup trigger comprising an analog signal that is digitized by the microprocessor,
    an output signal which actuates a disreef mechanism for disreefing the parachute upon descent to a user programmed flight parameter,
    wherein the microprocessor is user programmed for operation based solely on time without reference to altitude or other sensors; and wherein the device increments elapsed time in programmed divisions of milliseconds.

2. The programmable electronic initiation device as defined in claim 1, wherein the output signal actuates a parachute disconnect mechanism for disconnecting the parachute upon descent to a user programmed flight parameter.

3. The programmable electronic initiation device as defined in claim 1, wherein the startup trigger is commenced by operation of an electrical or mechanical switch.

4. The programmable electronic initiation device as defined in claim 1, wherein the startup trigger is commenced by operation of an input from an external computing source.

5. The programmable electronic initiation device as defined in claim 1, wherein the output signal actuates a plurality of parachute disconnect mechanisms for disconnecting the parachute upon descent to a user programmed flight parameter, said plurality of disconnect mechanisms being mutually inclusive, such that all disconnect mechanisms function to initiate the disconnecting of the parachute.

6. The programmable electronic initiation device as defined in claim 1, wherein, the output signal actuates a plurality of parachute disreef mechanisms for disreefing the parachute upon descent to a user programmed flight parameter, said plurality of disreef mechanisms being mutually inclusive, such that all disreef mechanisms must function to initiate the disreefing of the parachute.

7. The programmable electronic initiation device as defined in claim 1, wherein the output signal actuates multiple parachute disreef mechanisms for disreefing the parachute upon descent to user programmed flight parameters, said plurality of disreef mechanisms being mutually exclusive, such that each disreef mechanism functions independently and sequentially.

\* \* \* \* \*